United States Patent
Naito et al.

(10) Patent No.: US 7,116,027 B2
(45) Date of Patent: Oct. 3, 2006

(54) MAGNET FOR A DYNAMO-ELECTRIC MACHINE

(75) Inventors: Shinya Naito, Shizuoka-ken (JP); Haruyoshi Hino, Shizuoka-ken (JP); Hiroyuki Ishihara, Shizuoka-ken (JP); Junji Terada, Shizuoka-ken (JP); Tomohiro Ono, Shizuoka-ken (JP); Motokuni Nishiyama, Shizuoka-ken (JP); Masashi Kawasaki, Shizuoka-ken (JP)

(73) Assignee: Yamaha Motor Co. LTD, (JP)

( * ) Notice: Subject to any disclaimer, the term of this patent is extended or adjusted under 35 U.S.C. 154(b) by 0 days.

(21) Appl. No.: 11/058,921

(22) Filed: Feb. 16, 2005

(65) Prior Publication Data

US 2005/0174003 A1  Aug. 11, 2005

Related U.S. Application Data

(63) Continuation of application No. PCT/JP03/10387, filed on Aug. 15, 2003.

(30) Foreign Application Priority Data

Aug. 16, 2002  (JP)  ............................. 2002-237633

(51) Int. Cl.
  *H02K 21/24*  (2006.01)
  *H02K 1/16*  (2006.01)
  *H02K 1/22*  (2006.01)

(52) U.S. Cl. ........................... 310/156.32; 310/156.38; 310/268

(58) Field of Classification Search ...............
  310/156.01–156.02, 23, 32–38, 216, 154.29,
  310/154.17, 51
  See application file for complete search history.

(56) References Cited

U.S. PATENT DOCUMENTS 3,219,861 A * 11/1965 Burr ........................... 310/268

(Continued)

FOREIGN PATENT DOCUMENTS

JP  50-5923  2/1975

(Continued)

OTHER PUBLICATIONS

Preliminary Examination Report in related PCT Application No. PCT/JP2003/010387, mailed Nov. 16, 2004.

*Primary Examiner*—Darren Schuberg
*Assistant Examiner*—Erik Preston
(74) *Attorney, Agent, or Firm*—Knobbe Martens Olson & Bear LLP (57) ABSTRACT

A magnet for a dynamo-electric machine has a plurality of magnetic poles disposed substantially in a circular shape and opposite a plurality of teeth disposed substantially in a circular shape, the magnetic poles and teeth separated by a gap in an axial direction of a revolving shaft. A plurality of inter-pole sections extend circumferentially between adjacent magnetic poles out of the plurality of magnetic poles. The inter-pole sections have tooth-opposed surfaces that are recessed relative to the surfaces of the magnetic poles opposite the teeth in the direction of the revolving shaft. The plurality of magnetic poles and the plurality of inter-pole sections are integrally formed.

6 Claims, 9 Drawing Sheets

U.S. PATENT DOCUMENTS

| | | | | |
|---|---|---|---|---|
| 3,310,693 | A | * | 3/1967 | Aronoff ........................ 310/104 |
| 3,999,092 | A | * | 12/1976 | Whiteley ................. 310/156.32 |
| 4,634,906 | A | * | 1/1987 | Grosjean ................... 310/49 R |
| 5,021,698 | A | * | 6/1991 | Pullen et al. ........... 310/156.29 |
| 5,206,556 | A | * | 4/1993 | Hayakawa ............. 310/154.28 |
| 5,936,322 | A | | 8/1999 | Yamaguchi et al. |
| 6,037,696 | A | * | 3/2000 | Sromin et al. ................ 310/268 |
| 6,181,035 | B1 | * | 1/2001 | Acquaviva ..................... 310/51 |
| 6,323,572 | B1 | * | 11/2001 | Kinoshita ............... 310/156.07 |
| 6,774,519 | B1 | * | 8/2004 | Pullen et al. ........... 310/156.28 |

FOREIGN PATENT DOCUMENTS

| | | |
|---|---|---|
| JP | 64-030444 | 2/1989 |
| JP | 2001 057753 | 2/2001 |
| WO | PCT/JP03/10387 | 7/2003 |

* cited by examiner

MAGNET FOR A DYNAMO-ELECTRIC MACHINE

RELATED APPLICATIONS

This application is a continuation of PCT application PCT/JP2003-010387, which was filed on Aug. 15, 2003 and published in Japanese on Feb. 26, 2004 as WO 04/017489 A1, and which is incorporated herein by reference. The above PCT application claims priority to Japanese Patent Application Number 2002-237633, filed on Aug. 16, 2002.

BACKGROUND OF THE INVENTION

1. Field of the Invention

The present invention relates to a magnet for an axial gap dynamo-electric machine.

2. Description of the Related Art

Dynamo-electric machines have been used as drive sources in electric motorcycles or for other general electric motors. In recent years, use of an axial gap dynamo-electric machine as well as a radial gap dynamo-electric machine has attracted the public eye.

For example, an axial gap electric motor such as an axial gap dynamo-electric machine, has a disk shaped rotor yoke with a revolving shaft supported by a bearing thereof. A stator yoke has a laminated body in which, for example, disk-shaped steel plates are laminated along the center axis oppose with respect to each other, where the opposing surfaces thereof are orthogonal to the revolving shaft.

On the opposing surface of the rotor yoke, a magnet for generating a magnetic field is disposed, for example, in circular shape (ring shape), and the magnet has magnetic poles (N-pole, S-pole) disposed alternately circumferentially thereof.

On the opposing surface on the stator yoke, there are disposed a plurality of teeth along the radial direction (in the directions of radii) with respect to the revolving shaft. The surfaces of the magnet and the teeth opposing each other are orthogonal to the revolving shaft, and the gap between the opposing surfaces is formed into a plane perpendicular to the revolving shaft.

In other words, in a axial gap motor, a magnetic circuit is formed between the rotor and the stator, and the rotor is rotated using an attraction force and a repulsion force of the rotor-side magnet with respect to the respective teeth. The repulsion force is generated by sequentially switching the magnetic fluxes generating the respective teeth corresponding to the N-pole and the S-pole of the rotor-side magnet via coils wound around the respective teeth of the stator.

However, in the dynamo-electric machine described above, since the switching of the magnetic poles performed every time the magnetic pole of the magnet facing the teeth is switched in association with rotation of the rotor is very rapid, a harmonic content may be contained in the induced voltage waveform generated by mixed magnetic fluxes.

Such harmonic content may change the induced voltage waveform from a sinusoidal waveform to the deformed shape, and thus generate a torque ripple, which may lead to uneven rotation of the rotor, and hence to vibrations and/or noise.

Regarding this point, JP-A-2001-57753 discloses a construction in which pulsation of motor torque is reduced by forming grooves by grinding boundaries between the respective adjacent magnetic poles out of the plurality of magnetic poles stuck on an iron core of the rotor.

However, in the construction disclosed in the JP-A-2001-57753, it is required that the plurality of magnetic poles be adhered respectively on the iron core of the rotor. Then all the boundaries between the adjacent magnetic poles must be ground after such adhesion. Therefore, assembly of the rotor is more complicated, and the number of components of the rotor is increased.

SUMMARY OF THE INVENTION

In view of such circumstances, an object of the present invention is to provide a magnet for a dynamo-electric machine in which approximation of the induced voltage waveform to a sinusoidal waveform may be achieved without deteriorating the assemblability of the rotor when the magnetic poles of the magnet opposing the respective teeth are switched in association with rotation of the rotor.

A magnet for a dynamo-electric machine according to a first embodiment of the present invention includes a plurality of magnetic poles disposed substantially in a circular shape. Said poles oppose a plurality of teeth which are disposed substantially in a circular shape at a gap in the direction of the revolving shaft disposed substantially in a circular shape. A plurality of inter-pole sections extending between each adjacent magnetic poles among the plurality of magnetic poles in a circumferential direction and have tooth-opposed surfaces, which are set back along the revolving shaft with respect to the tooth-opposed surfaces of the magnetic poles. A circumferential width of an outer periphery of the inter-pole sections is preferably wider than a circumferential width on an inner periphery of the inter-pole sections. In a preferred embodiment, the plurality of magnetic poles and the plurality of inter-pole sections are integrally formed.

A dynamo-electric magnet according to a second embodiment of the present invention includes a plurality of magnetic poles opposing a plurality of teeth which are disposed substantially in a circular shape at a gap in the direction of the revolving shaft and disposed substantially into a circular shape. A plurality of inter-pole sections extend between each adjacent magnetic poles among the plurality of magnetic poles in a circumferential direction and have tooth-opposed surfaces, which are set back along the revolving shaft with respect to the tooth-opposed surfaces of the magnetic poles. In this embodiment, the width of the inter-pole section in the radial direction is smaller than the width of the respective magnetic pole in the radial direction. Additionally, the length along the radial direction from the revolving shaft to at least one of the peripheries on the inner peripheral side and the outer peripheral side of the inter-pole section differs from the length of a corresponding periphery of the magnetic pole.

In the second embodiment, the inner periphery of the inter-pole section is formed with a recessed inner periphery which is set back toward the outer periphery of the inter-pole section with respect to the inner periphery of the magnetic pole.

In the first or the second embodiments, the plurality of magnetic poles and the plurality of inter-pole sections constitute a resin magnet unit formed integrally with resin material.

As described above, with the magnet for a dynamo-electric machine according to the first and the second embodiments, the magnetic flux may be changed smoothly in association with rotation of the rotor (rotation of the magnetic pole) by reducing the magnetic flux at the inter-pole section in comparison with the adjacent magnetic pole.

Therefore, the induced voltage waveform corresponding to the mixed magnetic fluxes between the magnet of the rotor and the teeth may be approximated to a sinusoidal wave. Thus the generation of torque ripples may be substantially restrained so that smooth rotation of the rotor is maintained and the generation of vibrations/noise may be substantially prevented.

DETAILED DESCRIPTION OF THE PREFERRED EMBODIMENT

Figure 1:
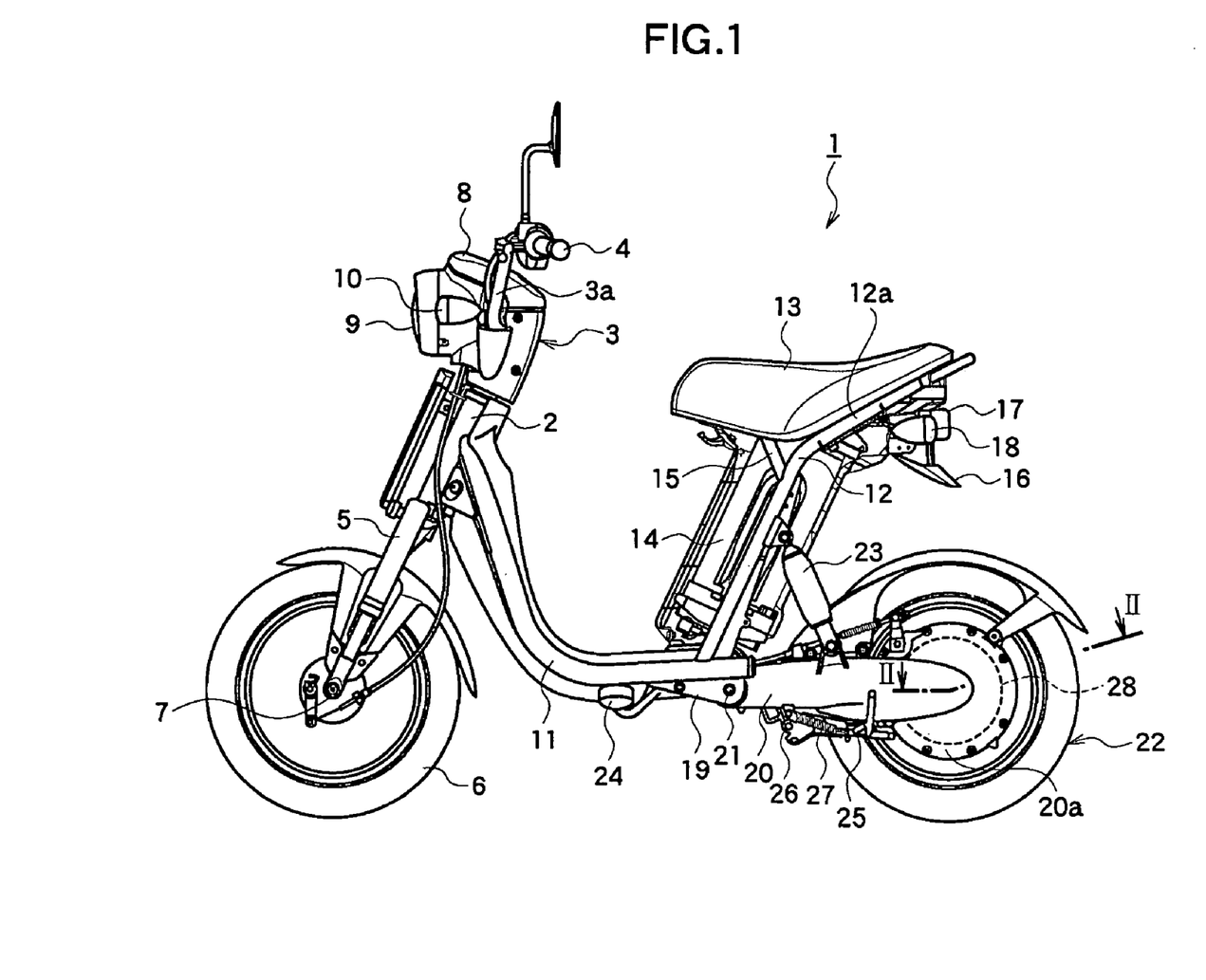
FIG. 1 is a side view of an electric motorcycle as an example of an apparatus on which an axial gap dynamo-electric machine having a magnet for a dynamo-electric machine according to an embodiment of the present invention is mounted.

Referring now to attached drawings, embodiments of the rotor according to the present invention will be described FIG. 1 is a side view of an electric motorcycle 1 on which an axial gap dynamo-electric machine, which is an example of a dynamo-electric machine using a magnet, according to an embodiment of the present invention, is mounted.

As shown in FIG. 1, the electric motorcycle 1 includes a head pipe 2 at the upper front of a vehicle body, and the head pipe rotatably accommodates a steering shaft, not shown, for changing the direction of the vehicle body therein. A handle supporting member 3, on which a handle 3a is fixed, is mounted at the upper end of the steering shaft, and grips 4 are mounted to both ends of the handle 3a. The right (far side of FIG. 1) grip 4, not shown, constitutes a rotatable throttle grip.

A pair of left and right front forks 5 are mounted to the head pipe 2 downward from the lower end thereof. At the respective lower ends of the front forks 5, a front wheel 6 is mounted via a front axle 7. The front wheel 6 is rotatably supported by the front axle 7 and is suspended by the front forks 5 in a damping manner. A meter 8 is disposed on the handle supporting member 3 in front of the handle 3a, and a head lamp 9 is fixed to the handle supporting member 3 below the meter 8. Flasher lamps 10 (only one of them is shown in FIG. 1) are disposed on both sides of the headlamp 9.

A pair of left and right vehicle body frames 11 each formed into a substantially L-shape in side view extend from the head pipe 2 rearwardly of the vehicle body. The vehicle body frames 11 are preferably round pipes, and extend from the head pipe 2 rearward and obliquely downward from the head pipe 2, and then horizontally toward the rear so as to be formed substantially into the L-shape in side view.

From the rear end sections of the pair of vehicle body frames 11, a pair of left and right seat rails 12 extend rearward and obliquely upward, and then the rear end sections 12a of the seat rails 12 are bent rearward along the shape of a seat 13.

Between the pair of left and right seat rails 12, there is provided a detachable battery 14. The battery 14 accommodates a plurality of secondary chargeable batteries.

In the vicinity of the bent portions of the pair of left and right seat rails 12, a seat stay 15 formed into an inverted U-shape is welded so as to be inclined upward toward the front with respect to the vehicle body. A seat 13 is disposed at the portion surrounded by the seat stay 15 and the left and the right seat rails 12. The seat 13 is preferably openable and closable, that is, so as to be capable of pivoting in the vertical direction about the front end of the seat 13.

A rear fender 16 is mounted to the rear ends of the seat rails 12, and a tail lamp 17 is mounted to the rear surface of the rear fender 16. In addition, flash lamps (only one of them is shown in FIG. 1) 18 are mounted on the left and the right of the tail lamp 17.

Rear arm brackets 19 (only one of them is shown in FIG. 1) are welded to the horizontal portions of the pair of left and right vehicle body frames 11 below the seat 13, respectively. The front ends of rear arms 20 are pivotably supported by the pair of left and right rear arm brackets 19 via a pivot shaft 21. A rear wheel 22, which is preferably a driving wheel, is rotatably supported by rear end section 20a of the rear arm 20, and the rear arm 20 and the rear wheel 22 are suspended by a rear cushion 23 in a damping manner.

A pair of left and right footsteps 24 (only one of them is shown in FIG. 1) are disposed below the horizontal portions of the left and the right vehicle body frames 11, respectively, and a side stand 25 is supported by the left rear arm 20 so as to be capable of rotating via a shaft 26 behind the footstep 24. The side stand 25 is urged toward the closing side by a return spring 27.

Figure 2:
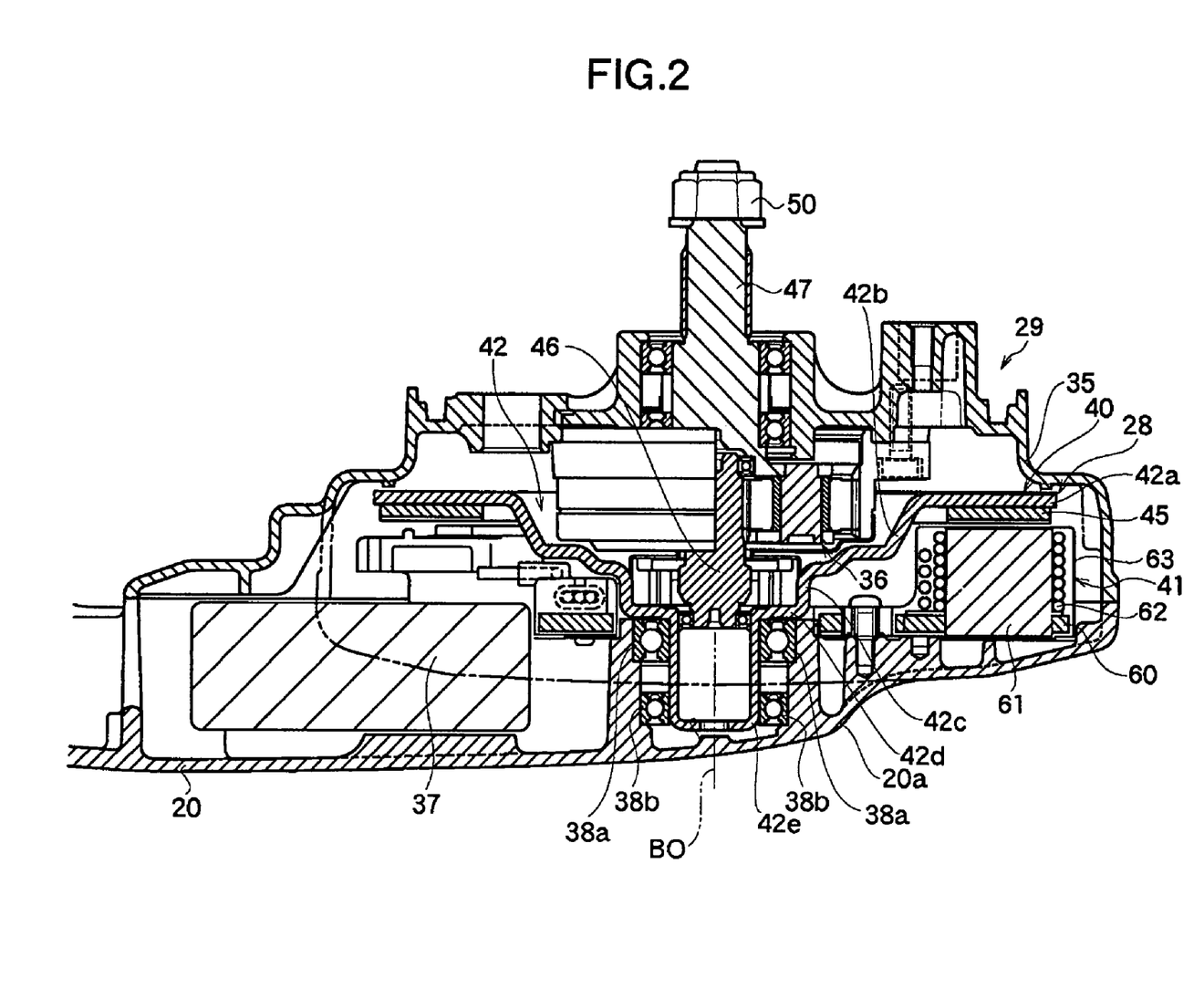
FIG. 2 is a cross sectional view (partly in side view) taken along the line II—II in FIG. 1 illustrating the inside of the rear end portion of a rear arm shown in FIG. 1.

FIG. 2 shows a drive unit 29 including an axial gap electric motor 28 (hereinafter, may be referred simply as electric motor 28) connected to the rear wheel 22 for rotating the rear wheel 22. The drive unit 19 is mounted in the rear end section 20a of the rear arm 20.

FIG. 2 is a cross-sectional view (partly in side view) taken along the line II—II in FIG. 1 for explaining the inside of the rear end section 20a of the rear arm 20. The rear wheel 22 is not shown.

As shown in FIG. 2, a gear cover 35 covers the right side surface of the rear end 20a of the rear arm 20. The electric motor 28 that constitutes the drive unit 29, a planet gear speed reducer 36, a controller 37, and so on are integrally assembled within a space formed therein.

The axial gap electric motor 28 includes, as shown in FIG. 2, a rotor 40 supported at the rear end section 20a of the rear arm 20 via bearings 38a, 38b so as to be rotatable about a center axis BO of the bearings 38a, 38b, and a stator 41 of substantially ring (doughnut) shape fixed to the inner surface of the rear end section 20a of the rear arm so as to oppose the rotor 40.

Figure 3:
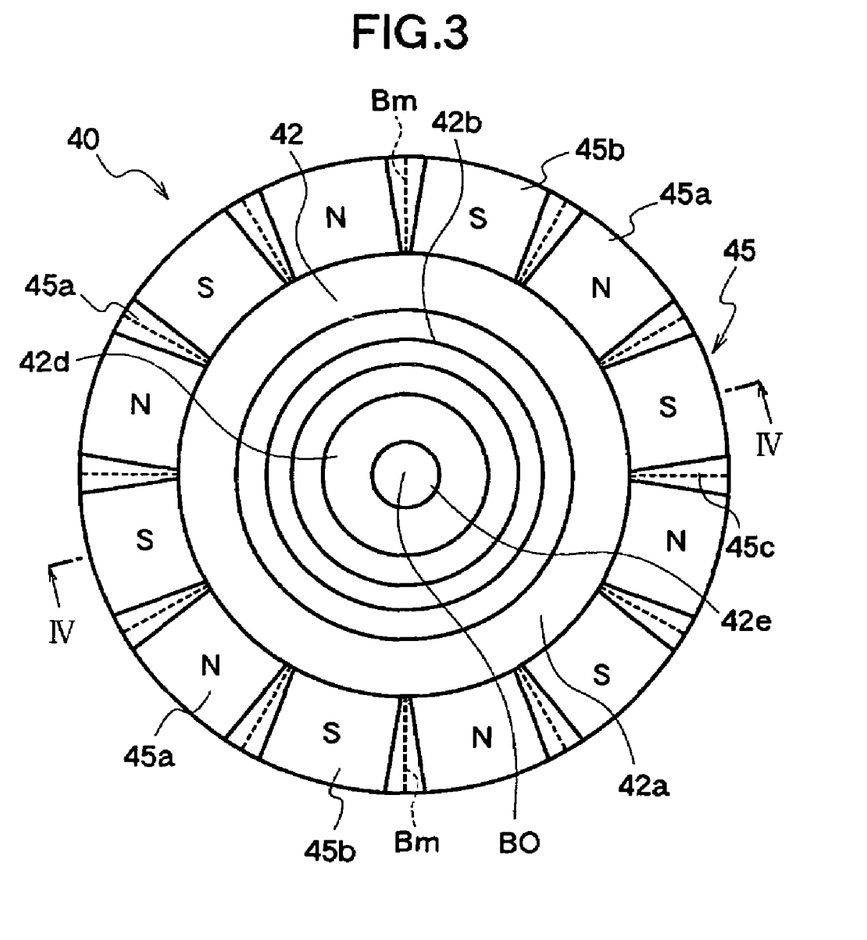
FIG. 3 is a plan view of a rotor on which a magnet according to one embodiment disclosed herein is fixed when viewed from the side of the stator shown in FIG. 2.
Figure 4:
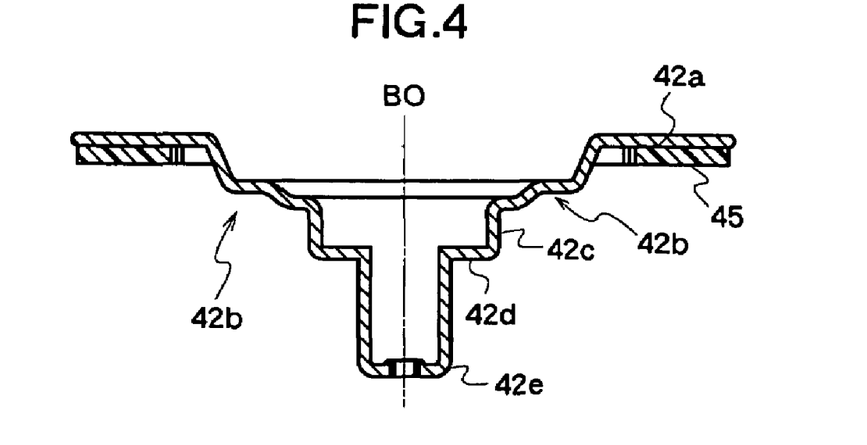
FIG. 4 is a cross-sectional view of the rotor taken along the line IV—IV in FIG. 3.

The rotor 40 includes, as shown in FIG. 2, FIG. 3, and FIG. 4, a rotor yoke 42 is shaped like a spinning top projecting toward the rear end section 20a of the rear arm 20.

In other words, the rotor yoke 42 includes a ring-shaped portion 42a opposing the stator 41, a tapered portion 42b extending in a substantially tapered shape (substantially conical shape) from the inner peripheral edge of the ring-shaped portion 42a toward the rear end section 20a of the rear arm 20, a first cylindrical portion 42c extending from the side peripheral edge of the rear end section 20a of the rear arm of the tapered portion 42b toward the rear end section 20a along the center axis BO in the projecting manner, a ring-shaped portion 42d extending radially inwardly from the side peripheral edge of the cylindrical portion 42c on the side of the rear end section 20a of the rear arm, and a second cylindrical portion 42e extending from the inner peripheral edge of the ring-shaped portion 42d toward the rear end section 20a along the center axis BO in a projecting manner.

The second cylindrical portion 42e is rotatably supported via the bearings 38a, 38b about the center axis BO, to construct a revolving shaft of the rotor 40. Therefore, the center of rotational axis of a revolving shaft 42e of the rotor 40 corresponds to the center axis BO of the bearings 38a, 38b.

The rotor 40 is fixed to the ring-shaped portion 42a of the rotor yoke 42 on the surface opposing the stator, and is provided with a magnet 45 for generating a magnetic field, being formed substantially into a circular shape (ring shape) which is coaxial with the center axis BO.

A revolving shaft 46 is connected to the revolving shaft 42e of the rotor 40 at the end on the rear wheel side coaxially with the rotor 40 (revolving shaft 42e), and the revolving shaft 46 is rotatable integrally with the rotor 40.

The planet gear speed reducer 36 is connected to the revolving shaft 46, and is assembled in the tapered portion 42b of the rotor yoke 42. The planet gear speed reducer 36 and the electric motor 28 partly overlap with each other in the direction of the width of the vehicle.

The planet gear speed reducer 36 is connected to a rear axle 47 disposed coaxially with the revolving shaft 46, and preferably reduces the speed of rotation (rotation of the revolving shaft 46) of the electric motor 28 and transmits it to the rear axle 47. A nut 50 is detachably screwed on the extremity 47a of the rear axle 47 projecting from the gear cover 35, and the rear wheel 22 is mounted and fixed to the rear axle 47 by screwing the nut 50 thereon.

As shown in FIG. 2, the stator 41 is fixed to the rear end section 20a of the rear arm 20, and includes a layered stator yoke 60 preferably formed by laminating disk-shaped or ring-shaped steel plates (in this embodiment, the ring-shaped steel plates are employed) along the direction of center axis, and a plurality of teeth 61 disposed substantially into a ring shape so as to oppose the magnet 45 at a predetermined gap, and each being preferably formed of a laminated steel plate.

As shown in FIG. 3 and FIG. 4, the magnet 45 includes a plurality of magnetic poles 45a (N-pole) and 45b (S-pole) opposing the above-described plurality of teeth 61 disposed substantially in a circular shape with the intermediary of a gap along the direction of revolving shaft BO and disposed substantially in the shape of circle. The N-poles 45a and the S-poles 45b are disposed alternately along the circumferential direction.

The magnet 45 is provided with a plurality of inter-pole sections 45c extending from each of the adjacent magnetic poles of the plurality of magnetic poles (N-pole 45a and S-pole 45b) along the circumferential direction, and a boundary of adjacent magnetic poles (boundaries between the adjacent N-poles and S-poles) Bm extends substantially along the radial direction substantially along the center of each inter-pole section 45c.

Figure 5:
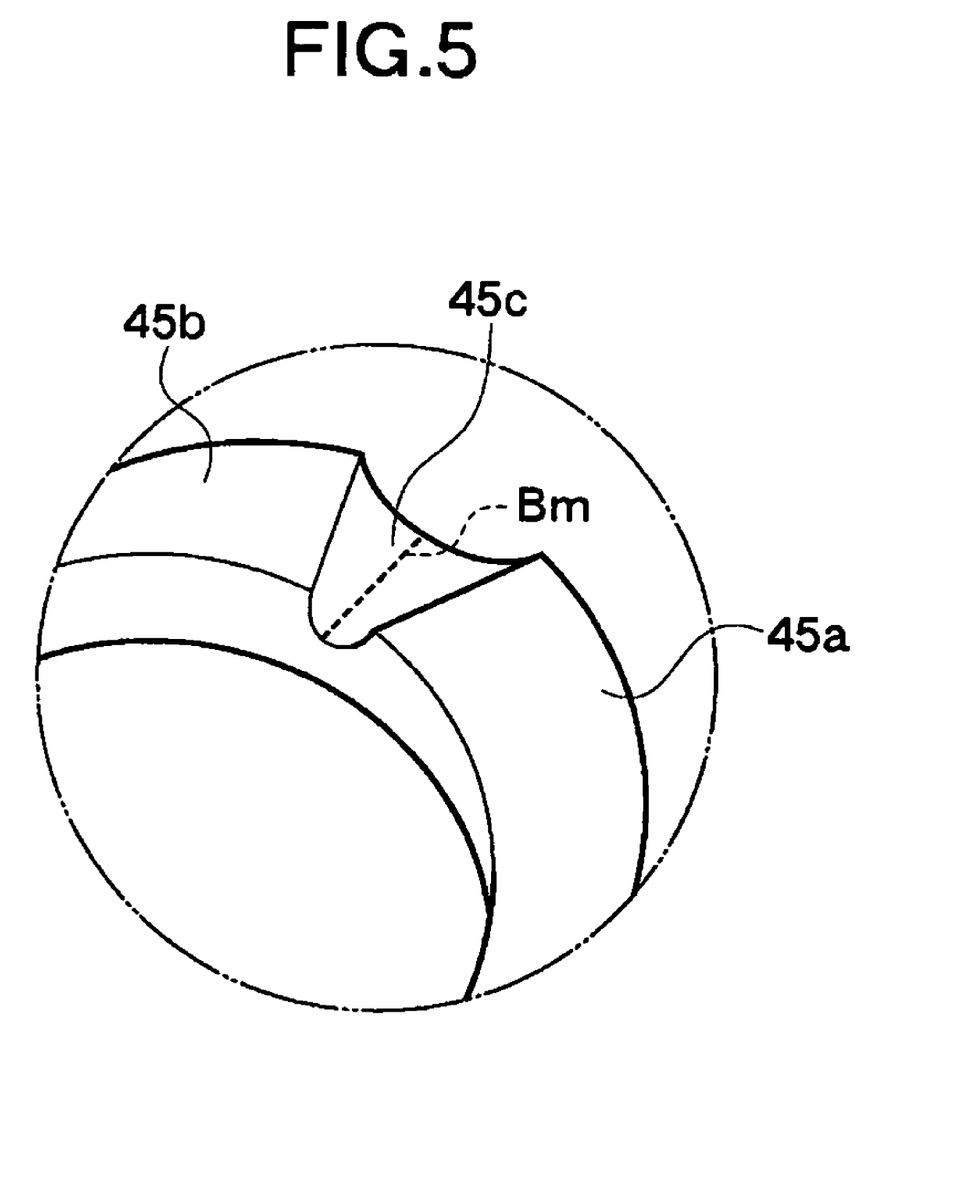
FIG. 5 is an enlarged perspective view of an inter-pole section shown in FIG. 3.

FIG. 5 is an enlarged drawing showing the inter-pole section 45c shown in FIG. 3. As shown in FIG. 5, the tooth-opposed surface of the inter-pole section 45c is recessed in a curved manner along the direction of the revolving shaft with respect to the tooth-opposed surfaces of the magnetic poles (the N-poles 45a and the S-poles 45b). That is, the inter-pole section 45c has a recessed tooth-opposed surface.

The area of the recessed tooth-opposed surface of the inter-pole section 45c is preferably smaller than those of the N-pole 45a and the S-pole 45b on both sides thereof. In addition, since only the harmonic content is removed while saving the fundamental harmonic content thereof, torque may be maintained substantially at a constant level in comparison with the case in which the recessed inter-pole sections are not present.

The depth of the recessed portion of the inter-pole section 45c along the direction of the revolving shaft and the curvature radius of the curved recessed portion are preferably set to values which provide a smooth variation of the magnetic flux, that will be described later.

The magnet 45 (magnet poles 45a, 45b and the inter-pole section 45c) in the present embodiment is, for example, a resin magnet (bonded magnet), formed of resin (mixture) of mixed (compounded) magnet powder and binder resin into a ring shape by injection molding.

Subsequently, the operation of the electric motor 28 provided with the magnet 45 having the construction described above will be described.

In the electric motor 28, a magnetic circuit is formed between the rotor 40 and the stator 41, and a magnetic flux supplied from the N-pole of the magnet 45 of the rotor 40 flows through the teeth 61 to the stator yoke 60, and then to the S-pole of the magnet 45 through other teeth 61.

In this state, when a coil 62 of a predetermined tooth 61 is energized, the predetermined tooth 61 is excited via the coil 62, and attraction and repulsion occurs between the tooth 61 and the magnet 45.

Therefore, by sequentially switching the teeth 61 to be excited via the controller 37 and the like, the teeth 61 to be excited may be shifted sequentially so that the rotor 40 is rotated with the magnet 45.

Figure 6A:
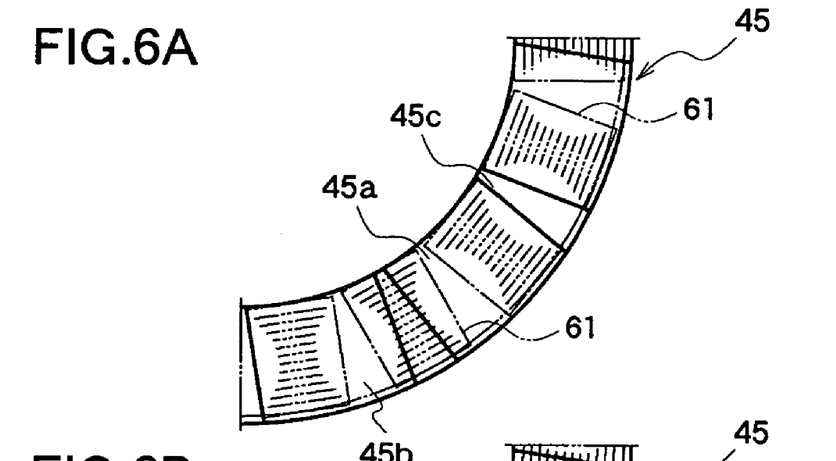
FIG. 6A to FIG. 6C are drawings showing a positional relation between the rotor shown in FIGS. 2, 3, and so on and teeth when the rotor is rotated.
Figure 6B:
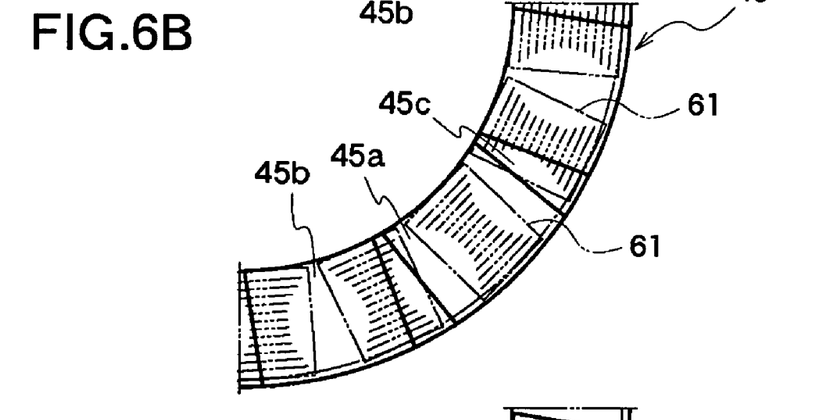
Figure 6C:
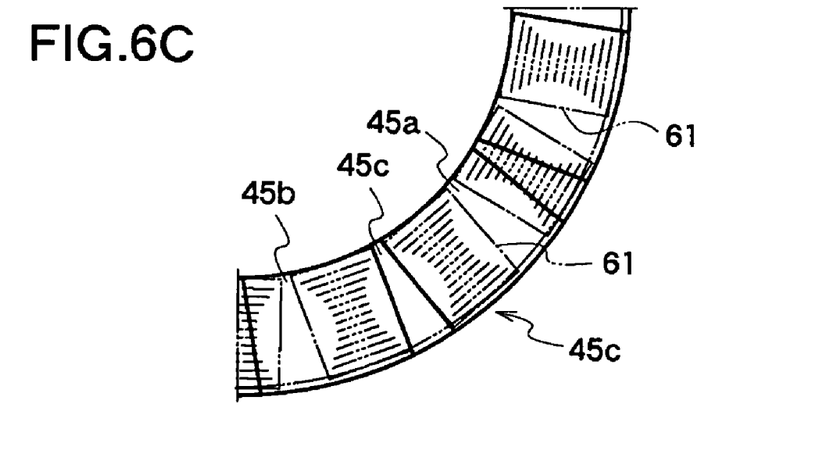

FIG. 6A to FIG. 6C are drawings showing a positional relation between the rotor 40 and the teeth 61 (shown by chain double-dashed line) when the rotor 40 is rotated.

In this case, assuming that the inter-pole sections 45c are not present, when the N-poles 45a and the S-poles 45b of the rotor 40 move from one tooth 61 to the next tooth 61, the magnetic flux changes rapidly, and thus the harmonic content may be generated due to such change in magnetic flux.

However, according to the electric motor 28 of the present embodiment, the magnet 45 includes adjacent magnetic pole (N-pole 45a and S-pole 45b) provided between the excited portions (N-pole 45a and S-pole 45b) of the magnet 45, the magnetic flux at the recessed inter-pole section 45c is decreased, and thus the magnetic flux changes smoothly when the N-pole 45a and 45b of the rotor 40 move from one predetermined tooth 61 to the next tooth 61.

Figure 7A:
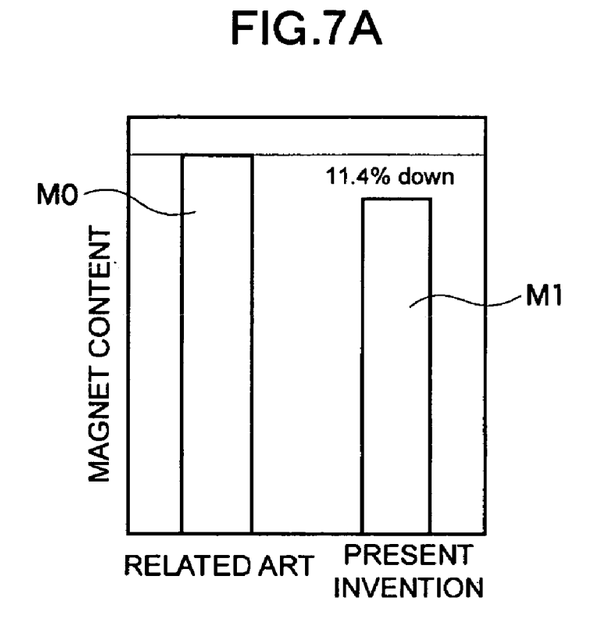
FIG. 7A is a chart showing a relation between the magnetic content of the magnet in the related art and the magnetic content of the magnet in one embodiment of the present invention.
Figure 7B:
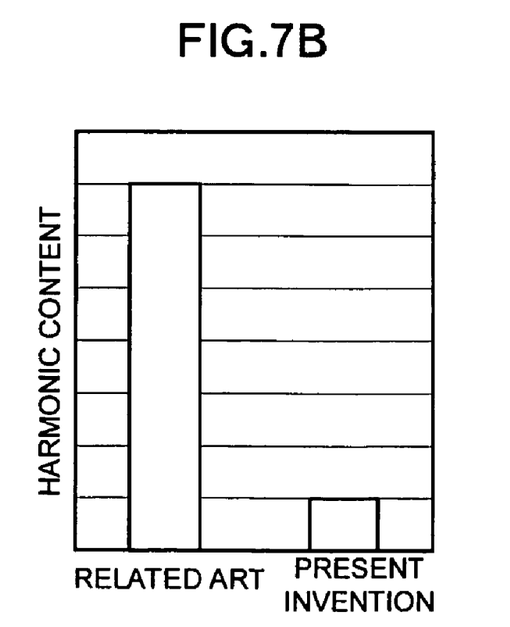
FIG. 7B is a drawing showing a ratio between the distortion factor of the induced voltage in the electric motor in which the magnet in the related art is employed and the distortion factor of the induced voltage in the electric motor in which a magnet according to one embodiment of the present invention (present embodiment) is employed.

FIG. 7A is a drawing showing a relation between the magnetic content M0 of the magnet in the related art in the case where torque is maintained at a constant value (in the case where the recessed inter-pole sections are not present) and the magnetic content M1 of the magnet 45 in the present embodiment(the vertical axis represents magnet content). FIG. 7B is a drawing showing a ratio between the distortion factor of the induced voltage (the amount of harmonic content) in the electric motor having the magnet in the related art (in the case in which the recessed inter-pole sections are not present) and the distortion factor of the induced voltage in the electric motor 28 in which the magnet 45 of the present embodiment is employed.

However, according to the electric motor 28 of the present embodiment, the magnet 45 includes adjacent magnetic poles (N-pole 45a and S-pole 45b) with an inter-pole section 45c disposed therebetween. The inter-pole section 45c has a recessed surface relative to the magnetic poles, with said surface facing one tooth 61 of the stator 41. Accordingly, the magnetic flux at the recessed inter-pole section 45c is reduced, and the magnetic flux therefore changes smoothly as the magnetic poles (N-pole 45a and S-pole 45b) of the rotor 40 move from one predetermined tooth 61 to the next tooth 61.

As is clear from FIG. 7B, the distortion factor of the induced voltage in the electric motor 28 using the magnet 45 according to the present embodiment is reduced to about ⅐ in comparison with the distortion factor of the induced voltage in the electric motor using the magnet in the related art, whereby the induced voltage waveform due to mixed magnetic flux may be approximate to a sinusoidal wave.

As is described thus far, according to the present embodiment, since the recessed inter-pole sections 45c each having the tooth-opposed surface set back with respect to the magnetic poles 45a and 45b are provided between the N-pole 45a and S-pole 45b of the magnet 45, the induced voltage waveform corresponding to the mixed magnetic flux between the magnet 45 of the rotor 40 and teeth 61 may approximate a sinusoidal wave. Consequently, the generation of torque ripples is restrained, and thus the smooth rotation of the rotor 40 is maintained, so that the generation of vibrations and noise is substantially prevented.

In addition, according to the present embodiment, the plurality of magnetic poles 45a, 45b and the plurality of inter-pole sections 45c constituting the magnet 45 are formed by integrally molding using resin mixture, for example, of magnet powder and binder resin into a ring shape by injection molding.

Therefore, in comparison with the construction in which the plurality of magnetic poles are adhered respectively on the iron core of the rotor, and then all the boundaries between the adjacent magnetic poles must be ground after such adhesion, as is disclosed in JP-A-2001-57753, the process adhering the plurality of magnetic poles and the process of grinding the boundaries between the adjacent magnetic poles may be eliminated. Thus, the above-described torque ripple restraining effect may be realized without making the assembly of the rotor 40 more difficult.

In addition, in comparison with the case in which the rotor is assembled by adhering the plurality of magnetic poles, it is not necessary to provide the plurality of magnetic poles independently, and thus the number of components of the rotor 40 may be reduced.

According to the present embodiment, the recessed inter-pole sections 45c are provided by setting back the portions between the N-poles 45a and the S-poles 45b into a curved shape. However, the configuration of the recessed portion are not limited to the curved shape, and may be any shape such as a rectangular shape.

Furthermore, according to the present embodiment, the recessed inter-pole sections 45c are provided between the N-pole 45a and the S-poles 45b for changing the magnetic flux smoothly when the N-poles 45a and the S-poles 45b of the rotor 40 move from one tooth 61 to the next tooth 61. However, the present invention is not limited thereto.

Figure 8:
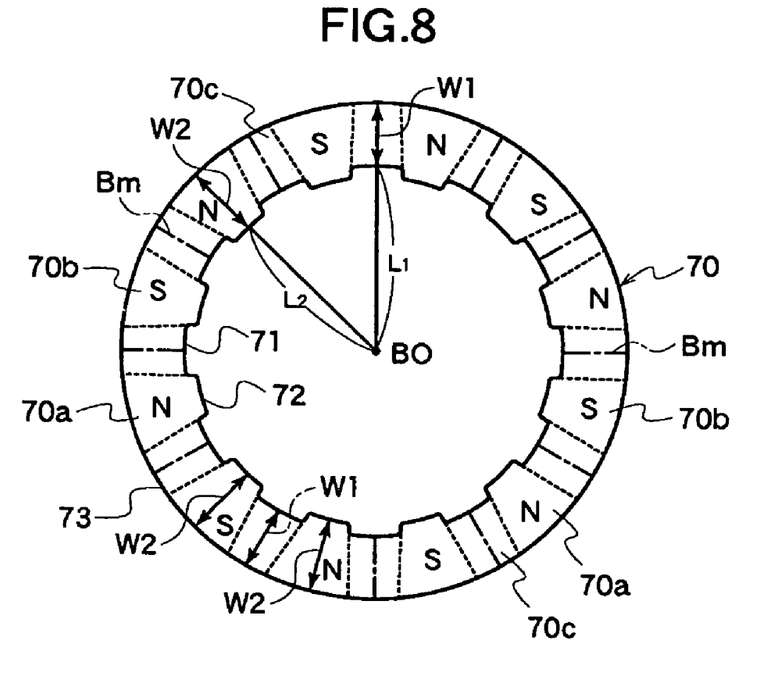
FIG. 8 is a drawing showing a magnet according to a first modification of the embodiment of the present invention.

In other words, FIG. 8 is a drawing showing a magnet 70 according to a first modification of the present embodiment.

As shown in FIG. 8, the magnet 70 is a resin magnet formed integrally, for example, by injection molding, and is provided with a plurality of magnetic poles 70a (N-pole) and 70b (S-pole) opposing the plurality of teeth 61 disposed substantially into the above-described shape of a circle with the intermediary of a gap along the direction of the revolving shaft BO and disposed substantially into the shape of a circle. The N-poles 70a and the S-poles 70b are disposed alternately along the circumferential direction.

The magnet 70 is provided with the plurality of inter-pole sections 70c extending from each of the adjacent magnetic poles of the plurality of magnetic poles (N-pole 70a and S-pole 70b) along the circumferential direction, and boundaries of the respective magnetic poles (boundaries between the adjacent N-poles and S-poles) Bm each extending substantially along the radial direction are substantially at centers of the inter-pole sections 70c.

In addition, in the magnet 70, the length L1 from the revolving shaft BO to the inner periphery 71 of the inter-pole section 70c along the radial direction is longer than the length L2 to the inner peripheries 72 of the magnetic poles 70a and 70b, and the radial width W1 of the inter-pole section 70c is shorter than the radial width W2 of the magnetic poles 70a and 70b.

In other words, in the magnet 70 the inner periphery 71 is formed into a recessed inner periphery by setting back the inner periphery 71 of the inter-pole section 70c with respect to the inner peripheries 72 of the respective magnetic poles 70a and 70b toward an outer periphery 73 of the inter-pole section 70c in a rectangular shape.

As a consequence, the inner peripheries 72 of the magnet poles 70a and 70b are projecting toward the revolving shaft BO in a rectangular shape.

In the electric motor 28 using the magnet 70 of this embodiment, since the inter-pole sections 70c, each having the inner periphery 71 being set back with respect to the inner peripheries 72 of the magnetic poles 70a and 70b, are provided between the magnet poles (N-pole 70a and S-pole 70b) of the magnet 70, the magnetic flux at the recessed inter-pole section 70c is reduced and thus the magnetic flux of the rotor 40 changes smoothly when the N-poles 70a and the S-poles 70b move from one predetermined tooth 61 to the next tooth 61.

As a consequence, the induced voltage waveform corresponding to the mixed magnetic fluxes between the magnet 70 of the rotor 40 and the teeth 61 may approximate a sinusoidal waveform, and thus the generation of torque ripples is substantially restrained so that smooth rotation of the rotor 40 may be maintained and the generation of vibrations/noise may be substantially prevented.

In the magnet 70 according to the first modification as well, the plurality of magnet poles 70*a*, 70*b* and the plurality of inter-pole sections 70*c* that constitute the magnet 70 are formed integrally of resin mixture of magnet powder and binder resin, for example, into a ring shape by injection molding.

Therefore, as in the embodiment described above, the torque ripple reducing effect is achieved without increasing the number of components of the rotor 40 while maintaining the ease of assembly of the rotor 40 at a high level.

Figure 9:
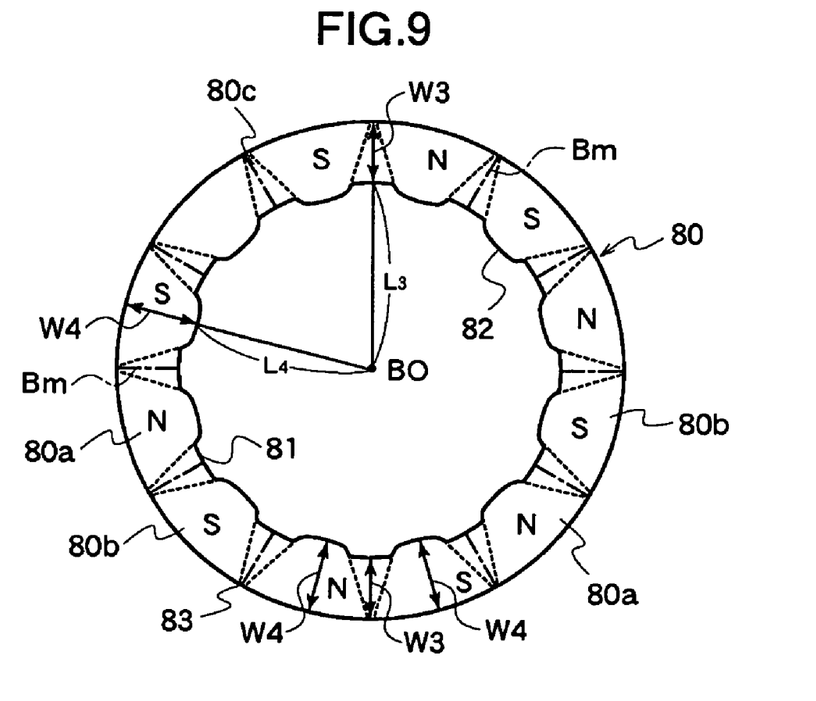
FIG. 9 is a drawing showing a magnet according to a second modification of the embodiment of the present invention.

FIG. 9 is a drawing showing a magnet 80 according to a second modification of the present embodiment.

The magnet 80 is also a resin magnet formed integrally, for example, by injection molding, and is provided with a plurality of magnetic poles 80*a* (N-poles) and 80*b* (S-poles) which are similar to the magnetic poles 70*a* and 70*b* shown in FIG. 8. A plurality of inter-pole sections 80*c*, and boundaries of the respective magnetic poles (boundaries between the adjacent N-poles and S-poles) Bm extend substantially along the radial direction substantially at the centers of the inter-pole sections 80*c*.

In the magnet 80, the length L3 from the revolving shaft BO to the inner periphery 81 of the inter-pole section 80*c* along the radial direction is longer than the length L4 to the inner peripheries 82 of the magnetic poles 80*a* and 80*b*, and the radial width W3 of the inter-pole section 80*c* is shorter than the radial width W4 of the respective magnetic poles 80*a* and 80*b*.

Then the inner periphery 81 of the inter-pole 80*c* is set back toward an outer periphery 83 of the inter-pole section 80*c* with respect to inner peripheries 82 of the respective magnetic poles 80*a* and 80*b*. The inner peripheries 82 of the respective magnetic poles 80*a* and 80*b* are projected in a curved manner toward the revolving shaft BO.

Since the inter-pole sections 80*c* having inner peripheries 81 which are set back with respect to the inner peripheries 82 of the respective magnet poles 80*a* and 80*b* are provided, the magnetic flux at the recessed inter-pole section 80*c* is reduced and thus the magnetic flux in association with rotation of the rotor 40 may be changed smoothly. As a consequence, the same effect as in the embodiment illustrated in FIG. 8 may be obtained.

Figure 10:
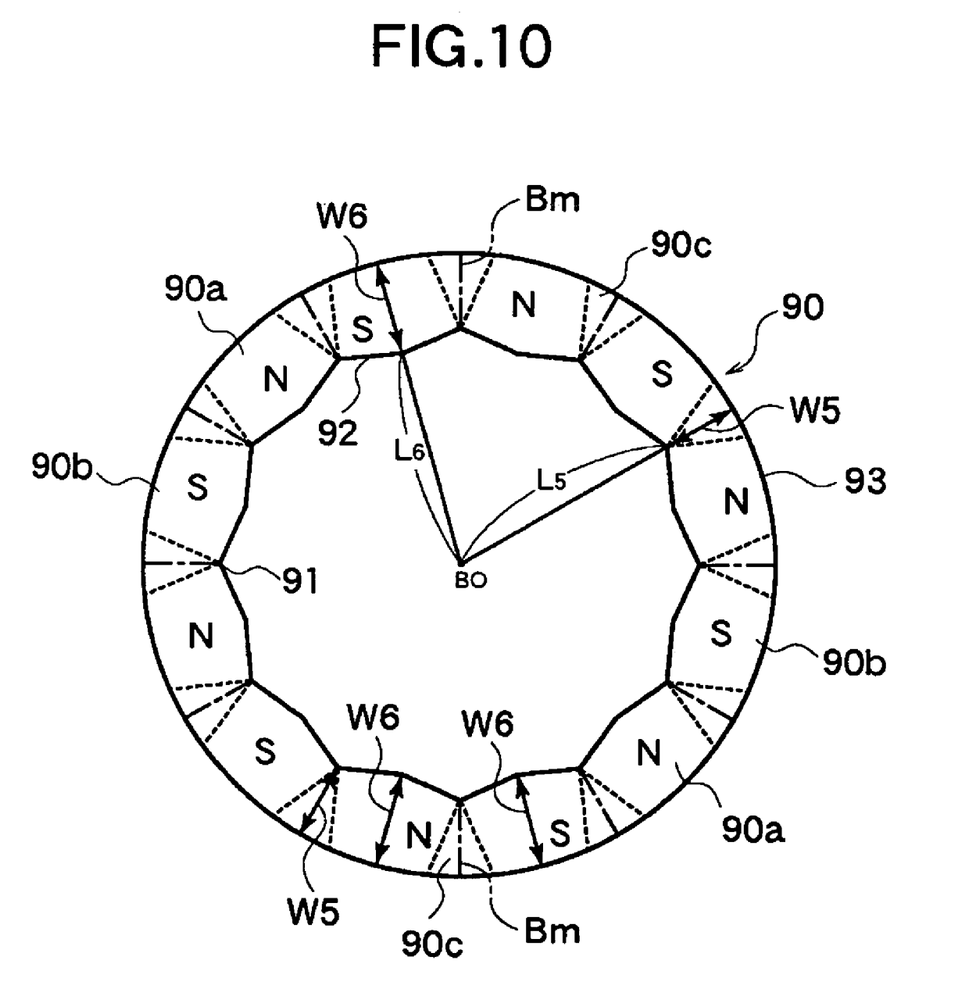
FIG. 10 is a drawing showing a magnet according to a third modification of the embodiment of the present invention.

FIG. 10 is a drawing showing a magnet 90 according to a third modification of the present embodiment.

The magnet 90 is also a resin magnet integrally formed, for example, by injection molding, and is provided with a plurality of magnetic poles 90*a* (N-poles) and 90*b* (S-poles) and the plurality of inter-pole sections 90*c*, which are substantially the same as in the first and the second modifications. The boundaries of the respective magnetic poles (boundaries between the adjacent N-poles and S-poles) Bm extend substantially along the radial direction substantially at the centers of the inter-pole sections 90*c*.

In the magnet 90, the length L5 from the revolving shaft BO to the inner periphery 91 of the inter-pole section 90*c* along the radial direction is longer than the length L6 to inner peripheries 92 of the magnetic poles 90*a* and 90*b*, and the radial width W5 of the inter-pole section 90*c* is shorter than the radial width W6 of the respective magnetic poles 90*a* and 90*b*.

In addition, in the magnet 90, the inner periphery 91 of the inter-pole section 90*c* is recessed toward the outer periphery 93 of the inter-pole section 90*c* with respect to the inner peripheries 92 of the respective magnetic poles 90*a* and 90*b* substantially into a V-shape, and the inner peripheries 92 of the respective magnetic poles 90*a* and 90*b* are projected toward the revolving shaft BO substantially in an inverted V-shape.

Since the inter-pole sections 90*c* having the inner peripheries 91 which are set back with respect to the inner peripheries 92 of the respective poles 90*a* and 90*b* are provided, the magnetic flux of the recessed inter-pole section 90*c* is reduced, and thus the magnetic flux in association with rotation of the rotor 40 may be changed smoothly. As a consequence, the same effects as in the first and the second modifications may be achieved.

In the first to the third modifications, the case in which the length from the revolving shaft BO to the inner periphery of the inter-pole section along the radial direction is longer than the length to the inner periphery of the respective magnetic poles has been described. However, the present invention is not limited thereto.

Figure 11:
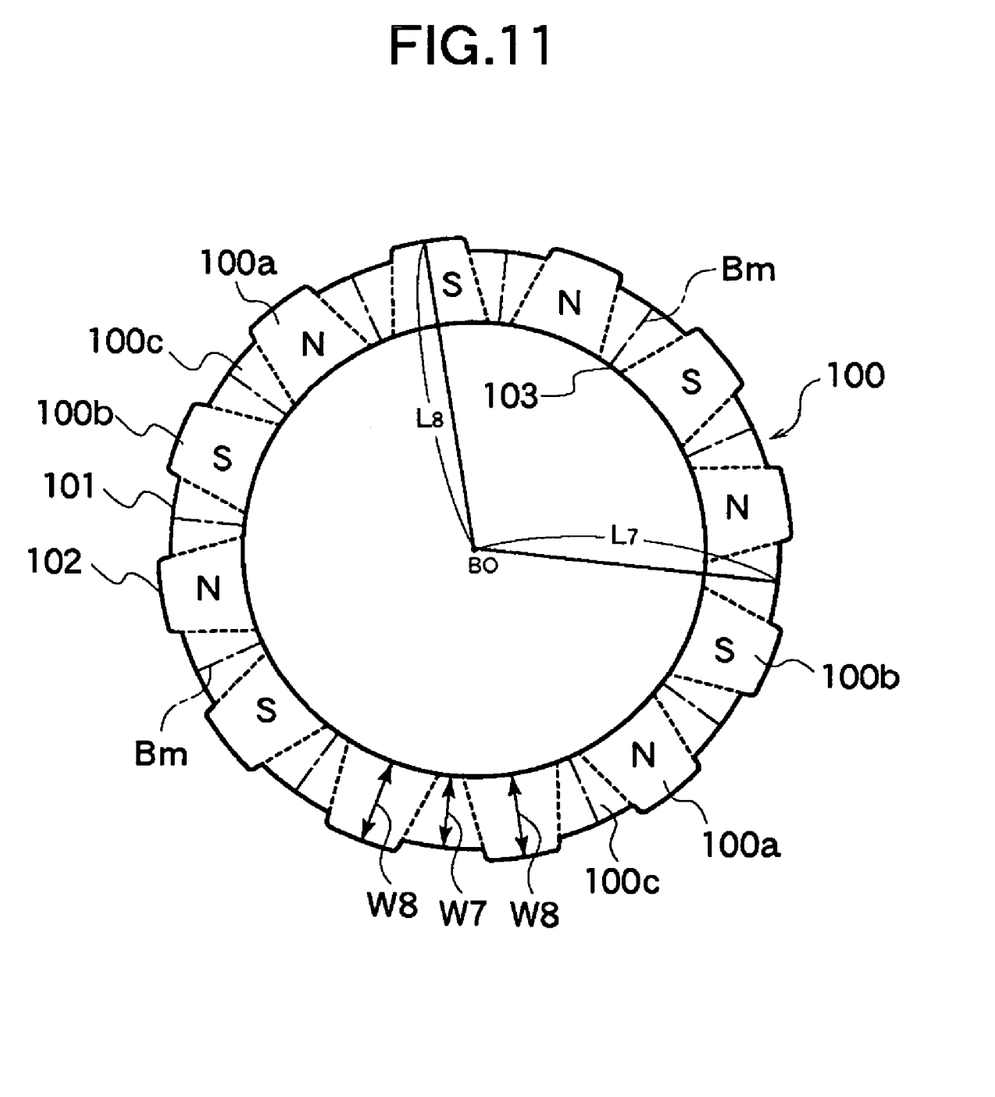
FIG. 11 is a drawing showing a magnet according to a fourth modification of the embodiment of the present invention.

In other words, FIG. 11 is a drawing showing a magnet 100 according to a fourth modification of the present embodiment.

As shown in FIG. 11, the magnet 100 is a resin magnet integrally formed, for example, by injection molding, and is provided with a plurality of magnetic poles 100*a* (N-poles), 100*b* (S-poles), and a plurality of inter-poles sections 100*c*, which are substantially the same as the first to the third modifications. Boundaries of the respective magnetic poles (boundaries between the adjacent N-poles and S-poles) Bm extend substantially along the radial direction substantially at the centers of the inter-pole sections 100*c*.

In the magnet 100, the length L7 from the revolving shaft BO to the outer periphery 101 of the inter-pole section 100*c* along the radial direction is shorter than the length L8 to outer peripheries 102 of the respective magnetic poles 100*a* and 100*b*, and the radial width W7 of the inter-pole section 100*c* is shorter than the radial widths W8 of the respective magnetic poles 100*a* and 100*b*.

Then, according to the magnet 100 in this modification, the outer periphery 101 of the inter-pole section 100*c* is set back toward the inner periphery 103 of the inter-pole section 100*c* in a substantially rectangular shape with respect to the outer peripheries 102 of the respective magnetic poles 100*a* and 100*b*. The outer peripheries 102 of the respective magnetic poles 100*a* and 100*b* are projected from the revolving shaft BO toward the outer periphery in a substantially rectangular shape.

In other words, in this modification, the outer periphery 101 of the inter-pole section 100*c* is set back with respect to the outer peripheries 102 of the respective magnetic poles 100*a* and 100*b* instead of setting back the inner periphery 103 of the inter-pole section 100*c*. In this arrangement as well, the magnetic flux at the recessed inter-pole section 100*c* is reduced, and thus the magnetic flux in association with rotation of the rotor 40 may be changed smoothly, whereby the same effect as the first to third modifications can be obtained.

Although the case in which only one of the inner periphery and the outer periphery of the inter-pole section is set back toward the other side has been described in the above-described embodiment and the modifications thereof, the present invention is not limited thereto, and both of the inner periphery and the outer periphery of the inter-pole section may be set back toward the other side, respectively.

It is also possible to combine the construction described in conjunction with the above-described embodiment, in which the teeth-opposed surface of the inter-pole section is set back along the revolving shaft, and the construction described in conjunction with the first to the fourth modifications in which at least one of the inner periphery and the outer periphery of the inter-pole section is set back toward the other side (toward the outer periphery when setting back the inner periphery, and toward the inner periphery when setting back the outer periphery), whereby the magnetic flux in association with rotation of the rotor 40 can be changed further smoothly.

In the above-described embodiment and the respective modifications, the magnet is used for the axial gap dynamo-electric machine mounted to the motorcycle. However, the present invention is not limited thereto, and may be applied to the axial gap dynamo-electric machine which is mounted to other apparatus/equipment, and the same effects as described above will be achieved.

In addition, in the above-described embodiment and the respective modifications, the axial gap dynamo-electric machine (electric motor) as an axial gap dynamo-electric machine on which the magnet according to the present invention is mounted has been described. However, the present invention is not limited thereto, and may be applied to so-called electric generator, which allows a coil to generate electromotive force by rotating the rotor from the outside.

The above-described embodiment and the respective modifications has been described to have a rotor as a magnet side, and a stator as a coil side. However, the present invention is not limited thereto, and may have a stator as a magnet side and a rotor as a coil side, which achieves substantially the same effects as the embodiments described above.

In addition, in the above-described embodiment and the respective modifications, the magnet according to the present invention has been described as a resin magnet integrally formed by injection molding. However, the present invention is not limited thereto, and may be, for example, a sintered magnet or the like.

The various devices, methods and/or techniques described above provide a number of ways to carry out the invention. Of course, it is to be understood that not necessarily all objectives or advantages described may be achieved in accordance with any particular embodiment described herein. Also, although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments herein.

What is claimed is:

1. A dynamo-electric magnet for a dynamo-electric machine comprising:
   a plurality of magnetic poles disposed substantially into a circular shape, said poles disposed opposite a plurality of teeth disposed substantially in a circular shape, the poles and teeth separated by an axial gap in the direction of a revolving shaft; and
   a plurality of inter-pole sections, each of said inter-pole sections extending between adjacent magnetic poles among the plurality of magnetic poles in a circumferential direction and connecting the adjacent magnetic poles, each of said inter-pole sections defining a boundary between adjacent magnetic poles, said boundary bisecting each of the inter-pole sections, the plurality of magnetic poles and the plurality of inter-pole sections being integrally formed, a width of the inter-pole sections in a radial direction being smaller than a width of the adjacent magnetic pole in the radial direction, and a length along the radial direction from the revolving shaft to at least one of the inner periphery and the outer periphery of each of the inter-pole sections being different from the length from the shaft to a corresponding periphery of the adjacent magnetic poles in the radial direction.

2. A dynamo-electric magnet for a dynamo-electric machine comprising:
   a plurality of magnetic poles disposed substantially into a circular shape, said poles disposed opposite a plurality of teeth disposed substantially in a circular shape, the poles and teeth separated by an axial gap in the direction of a revolving shaft; and
   a plurality of inter-pole sections, each of said inter-pole sections extending between adjacent magnetic poles among the plurality of magnetic poles in a circumferential direction and connecting the adjacent magnetic poles, each of said inter-pole sections defining a boundary between adjacent magnetic poles, said boundary bisecting each of the inter-pole sections,
   wherein a width of the inter-pole sections in a radial direction is smaller than a width of the adjacent magnetic pole in the radial direction, and
   wherein a length along the radial direction from the revolving shaft to at least one of the inner periphery and the outer periphery of each of the inter-pole sections is different from the length from the shaft to a corresponding periphery of the adjacent magnetic poles in the radial direction.

3. A magnet for a dynamo-electric machine according to claim 2, wherein the inner periphery of each of the inter-pole sections is formed into a recessed inner periphery which is recessed in a radial direction toward the outer periphery of the inter-pole sections relative to the inner peripheries of the adjacent magnetic poles to form a recessed inner periphery, and
   wherein the plurality of magnetic poles and the plurality of inter-pole sections are integrally formed.

4. A magnet for a dynamo-electric machine according to claim 3, wherein each of the plurality of inter-pole sections includes a surface opposite at least one of the teeth which is recessed along a direction of the revolving shaft relative to a surface of a magnetic pole disposed opposite at least one of the teeth.

5. A magnet for a dynamo-electric machine according to claim 2, wherein a circumferential width on the outer periphery of the inter-pole sections is wider than a circumferential width on the inner periphery of the inter-pole sections.

6. The magnet of claim 2, wherein the recessed surface of each of the inter-pole sections has an area extending between the inner periphery and the outer periphery of the inter-pole sections, the area further extending between adjacent magnetic poles, said area being smaller than an area of one of the adjacent magnetic poles.

* * * * *

UNITED STATES PATENT AND TRADEMARK OFFICE
CERTIFICATE OF CORRECTION

PATENT NO. : 7,116,027 B2
APPLICATION NO. : 11/058921
DATED : October 3, 2006
INVENTOR(S) : Naito Shinya et al.

It is certified that error appears in the above-identified patent and that said Letters Patent is hereby corrected as shown below:

At Col. 1, Line 44 (approx.), after "in" delete "a" and insert -- an --, therefore.

At Col. 2, Line 32 (approx.), after "preferred" delete "embodiment,the" and insert -- embodiment, the --, therefor.

At Col. 3, Line 57 (approx.), after "described" insert --. --.

At Col. 7, Lines 3-10, delete "However, according to the electric motor 28 of the present embodiment, the magnet 45 includes adjacent magnetic pole (N-Pole 45a and S-pole 45b) provided between the excited portions (N-pole 45a and S-pole 45b) of the magnet 45, the magnetic flux at the recessed inter-pole section 45c is decreased, and thus the magnetic flux changes smoothly when the N-pole 45a and 45b of the rotor 40 move from one predetermined tooth 61 to the next tooth 61." and insert -- However, according to the electric motor 28 of the present embodiment, the magnet 45 includes adjacent magnetic poles (N-pole 45a and S-pole 45b) with an inter-pole section 45c disposed therebetween.  The inter-pole section 45c has a recessed surface relative to the magnetic poles, with said surface facing one tooth 61 of the stator 41.  Accordingly, the magnetic flux at the recessed inter-pole section 45c is reduced, and the magnetic flux therefore changes smoothly as the magnetic poles (N-pole 45a and S-pole 45b) of the rotor 40 move from one predetermined tooth 61 to the next tooth 61. --, therefor, At Col. 7, Line 16, delete "embodiment(the" and insert -- embodiment (the --, therefor.)

At Col. 7, Lines 24-34 (approx.), delete "However, according to the electric motor 28 of the present embodiment, the magnet 45 includes adjacent magnetic poles (N-

UNITED STATES PATENT AND TRADEMARK OFFICE
CERTIFICATE OF CORRECTION

| | | |
|---|---|---|
| PATENT NO. | : 7,116,027 B2 | Page 2 of 2 |
| APPLICATION NO. | : 11/058921 | |
| DATED | : October 3, 2006 | |
| INVENTOR(S) | : Naito Shinya et al. | |

It is certified that error appears in the above-identified patent and that said Letters Patent is hereby corrected as shown below:

At Col. 7, Lines 24-34 (approx.), (cont'd)

pole 45a and S-pole 45b) with an inter-pole section 45c disposed therebetween. The inter-pole section 45c has a recessed surface relative to the magnetic poles, with said surface facing one tooth 61 of the stator 41. Accordingly, the magnetic flux at the recessed inter-pole section 45c is reduced, and the magnetic flux therefore changes smoothly as the magnetic poles (N-pole 45a and S-pole 45b) of the rotor 40 move from one predetermined tooth 61 to the next tooth 61." and insert -- As is clear from FIG. 7A, in the magnet 45 according to the present embodiment, since the inter-pole sections 45c are set back while maintaining the torque, the magnet content corresponding to the set back portion may be reduced (for example, approximately 11.4% can be reduced), which may contribute to reduction of the cost of the dynamo-electric machine. --, therefor.

Signed and Sealed this

Eighth Day of May, 2007

JON W. DUDAS
*Director of the United States Patent and Trademark Office*